UNITED STATES PATENT OFFICE.

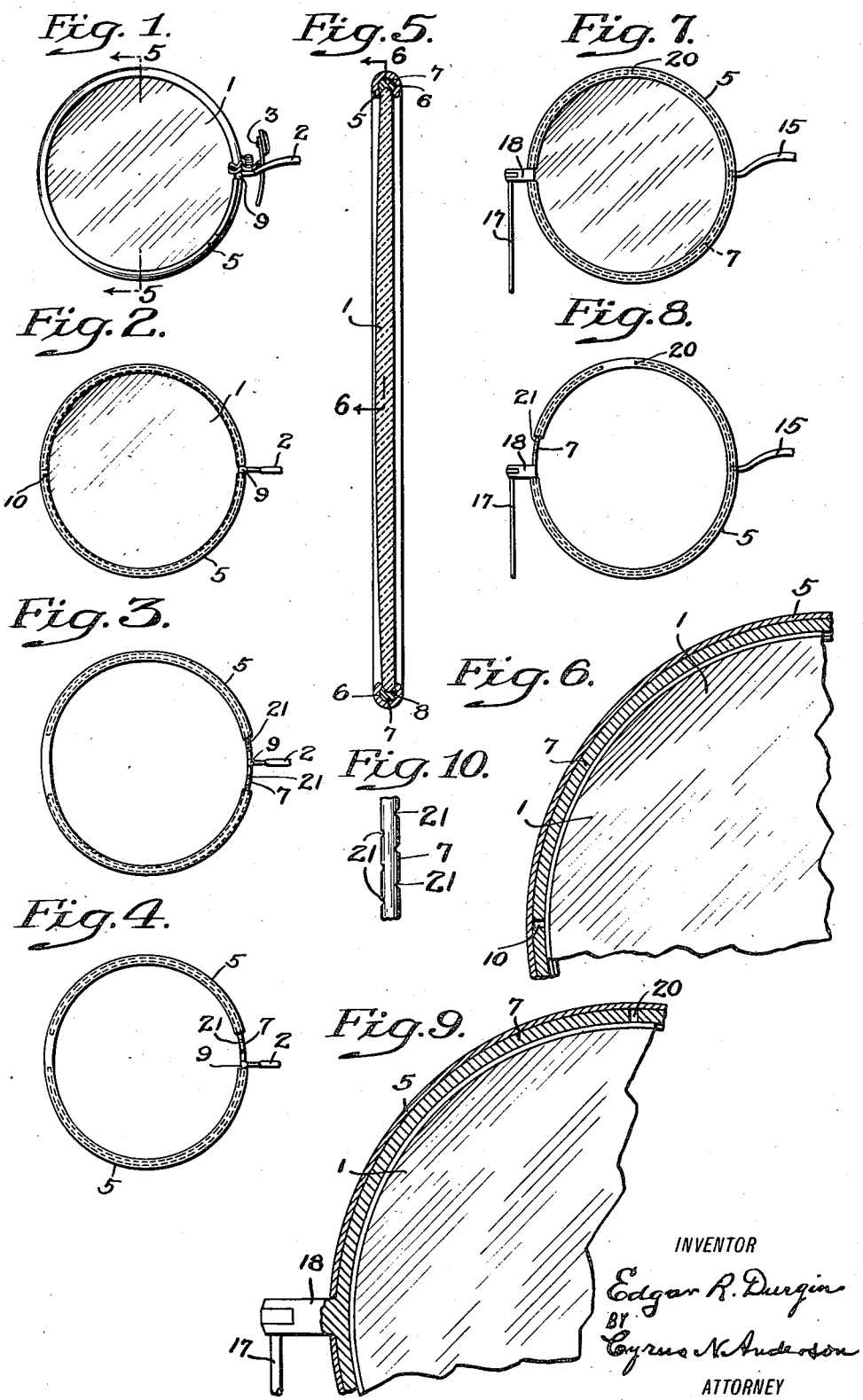

EDGAR R. DURGIN, OF NEWARK, NEW JERSEY, ASSIGNOR TO NEW JERSEY OPTICAL CO., OF NEWARK, NEW JERSEY, A CORPORATION OF NEW JERSEY.

RIM FOR OPHTHALMIC LENSES.

1,409,534.   Specification of Letters Patent.   Patented Mar. 14, 1922.

Application filed April 26, 1920. Serial No. 376,442.

*To all whom it may concern:*

Be it known that I, EDGAR R. DURGIN, a citizen of the United States, and a resident of Newark, in the county of Essex and State of New Jersey, have invented an Improvement in Rims for Ophthalmic Lenses, of which the following is a specification.

My invention relates to rims for ophthalmic lenses of the type generally identified and described as combination metal and non-metal rims.

The principal object of my invention is to provide a construction of rim including means whereby the lens may be placed therein and removed readily therefrom without the necessity of loosening or removing screws or other equivalent holding means.

A further object of my invention is to provide a construction of metal and non-metal rim in which the metal and non-metal parts are secured together in such manner that they may be moved relatively to each other to increase the size thereof to facilitate the insertion or removal of a lens into or therefrom.

Other objects and advantages of my invention will be referred to and pointed out in the detailed description thereof which follows or will be apparent from such description.

In order that my invention may be readily understood and its practical advantages fully appreciated, reference may be had to the accompanying drawing in which convenient forms of embodiment thereof are shown.

In the drawing:

Fig. 1 is a front elevation of one half portion of a pair of eyeglasses in which the rim is constructed in accordance with my invention;

Fig. 2 is a similar view with certain of the mountings which are shown in Fig. 1 omitted, and the structure being shown more in detail;

Fig. 3 is a view in side elevation of the rim with the lens removed and with the metal and non-metal parts of the rim adjusted so as to enlarge the size of the rim;

Fig. 4 is a view similar to Fig. 3 but showing a different relative adjustment of the metal and non-metal parts;

Fig. 5 is a transverse sectional view taken on the line 5—5 of Fig. 1;

Fig. 6 is a sectional view taken on the line 6—6 of Fig. 5;

Fig. 7 is a front elevational view of one half portion of a pair of spectacles in which the rim is constructed in accordance with my invention;

Fig. 8 is a view in elevation of one half portion of a pair of spectacles with the lens removed and with the metal and non-metal parts of the rim adjusted so as to enlarge the rim for the insertion or removal of a lens;

Fig. 9 is a central sectional view of a portion of the rim taken in a plane parallel with the lens, a portion of the latter being shown in elevation; and Fig. 10 is a view of a portion of a metal eye-wire part enlarged so as to more clearly show certain notches therein.

Referring to Figs. 1 to 6 of the drawing, in which my invention is disclosed as being embodied in a pair of nose glasses, 1 designates the lens and 2 the bridge by means of which the rims and lenses are connected together. 3 designates the spring pressed nose gripping members by means of which the glasses are supported upon the nose. The rim comprises the outer non-metallic part 5 having an interior groove 6 in which is seated the inner metallic member 7, the latter being provided with a groove 8 in which the peripheral edge of the lens 1 is seated.

The bridge is connected, as shown at 9, directly to the metal part 7 of the rim. The metal part 7 of the rim consists of a single member bent to the shape desired, which may be round, oval or irregular, with its ends normally in adjacent opposed relation to each other, as indicated at 10 in Figs. 2 and 6.

The opposite ends of the non-metallic part 5 of the rim are normally situated in abutting relation with respect to the end of the bridge 2 which is connected to the metal part of the rim. The parts 5 and 7 of the rim are shown in their normal relation with respect to each other with the lenses held therein in Figs. 1 and 2. In order that the size of the rim may be adjusted or increased the parts 5 and 7 of the rim are made slidable or telescoping with respect to each other, so that the ends of the parts 5 may be moved outwardly or away from each other into the positions shown in Fig. 3. Such relative adjustment between the parts 5 and 7 causes the ends of the inside metal part of the rim to separate or move away from each other, as is clearly indicated in Fig. 3. In order to hold the parts 5 and 7 in interlocked relation with respect to each other the inner edges of the former overlie the latter as indicated in Fig. 5 of the drawing. The surface of the groove 6 should fit closely against the outer surface of the metal part 7 and yet loose enough to permit relative sliding and adjusting movements between the two.

In Fig. 4 a construction is shown in which only one end of the part 5 has been moved away from its position against the end of the bridge 2. This modification is shown in order to make clear that it is not necessary that both ends of the part 5 need be shifted or adjusted with relation to the inner metal part 7 of the rim. In Figs. 1 to 6 inclusive the opposite ends of the inner metal part 7 of the rim are situated normally substantially diametrically opposite the end of the bridge 2, but it will be understood that these ends may be positioned at other points with respect to the rim and with respect to the end of the bridge. For instance, the gap or break between the ends may be situated ninety degrees, more or less, in either direction from the position in which they are shown in the present construction.

In Figs. 7 to 9 inclusive I have shown my invention embodied in a pair of spectacles in which the opposite ends of the bridge 15 are connected by soldering or otherwise to the metal eye-wires 7, notches being provided in the rear edge of the non-metal parts 5 to permit such connection. The temple wires 17 are secured to lugs 18 secured to the inner metal eye-wire parts 7 of the rims at points diametrically across the rims and any lenses which may be present therein from the ends of the bridge 15. The opposite ends of the part 5 of each rim normally occupy positions in abutting relation with respect to the temple lug 18. The opposite ends of the part 7 of each rim are, in the construction shown, situated at the upper side of the structure as indicated at 20. It will be understood, however, that the ends may be positioned at other points with respect to the rim and also that if desired they may be situated in that portion of the rim below the line between the end of the bridge and temple lug.

As in the construction shown in Figs. 1 to 6 inclusive, the parts 5 and 7 are slidably connected so that one end of the part 5 may be moved away from the temple lug 18, as shown in Fig. 8. The end which is moved away from the temple lug is that which is on the same side of the said lug as the ends of the metal eye-wire part 7.

In both forms of construction it is apparent that the inner and outer metal and non-metal rim parts or members may be adjusted with relation to each other for the purpose of enlarging the diameter of the rim to permit the insertion and removal of lenses into and from the said rims.

In order to somewhat more securely attach or fasten the non-metal and metal parts 5 and 7 together so as to avoid accidental adjustment or relative movement thereof, I have provided in the metal eye-wire part in both forms of construction at points preferably adjacent the ends of the non-metal rim part 5, notches 21 into which portions of the material of the non-metal part of the rim flow when the said part is being formed upon the metal eye-wire part. At such time, the material of the part 5 having been heated, it is more or less plastic so that it is feasible to cause projections therefrom to enter the said notches 21. When the non-metal part 5 cools and dries out a certain amount of shrinkage takes place so that it is practical to adjust the non-metal and metal parts 5 and 7 relatively to each other, as described, and yet the presence of said notches 21 and the projections upon the inner sides of the groove prevents accidental relative movement or adjustment of the parts.

It will be seen that by my invention I have provided a very simple construction which is adapted to permit the ready and easy insertion and removal of lenses into and from the rims of eyeglasses and spectacles; also, that my invention is susceptible of embodiment in other and various forms of construction of metal and non-metal rims for eyeglasses and spectacle lenses. The essential thing is that in whatever form of construction the invention may be embodied the two parts of which the rim is composed shall be connected so as to permit longitudinal slidable adjustment with respect to each other in order that the size or diameter of the rim may be increased for the purpose hereinbefore set forth.

I claim:

1. A rim for ophthalmic lenses comprising inner and outer rim members which are slidably interlocked and adapted to be adjusted longitudinally with respect to each other.

2. A rim for ophthalmic lenses comprising inner and outer rim members, the inner member being seated within a groove upon the inner side of the outer member and the said two members being slidably connected.

3. A rim for ophthalmic lenses comprising inner and outer permanently interlocked rim members, the said members being slidable longitudinally with respect to each other and the ends of said members being disconnected from each other and normally occupying positions in adjacent opposing relation with respect to each other.

4. A rim for ophthalmic lenses comprising an inner metallic rim member having an inner peripheral groove adapted to engage the edge of a lens, the opposite ends of said member being disconnected from each other, and an outer non-metallic rim member provided with a groove upon its inner side in which the said metallic member is seated, the edges of said outer non-metallic member upon opposite sides of the said groove extending inwardly to overlap portions of the said metallic member, and the ends of the said non-metallic member being disconnected from each other and being situated at points a distance from the ends of the metallic member.

5. A rim for ophthalmic lenses comprising inner and outer interlocking members, the said members being slidable longitudinally with respect to each other, and the opposite ends of each of said members being separable and the ends of one member being situated a distance from the ends of the other member.

6. In an ophthalmic mounting the combination of a bridge, a metal rim part rigidly connected to an end of said bridge at a point intermediate its ends, the latter being adapted to be moved toward and from each other, and a non-metallic rim member in interlocked engagement with the said metal rim part, the opposite ends of the said non-metal part normally occupying positions in abutting relation with respect to the end of the said bridge and the said rim members being longitudinally adjustable with respect to each other.

7. A rim for ophthalmic lenses comprising an inner metal eye-wire part and an outer non-metallic part, the ends of each of said parts being disconnected from each other and the inner part being seated within a groove upon the inner side of the outer part and the said two parts being slidably connected.

8. A rim for ophthalmic lenses comprising an inner metal eye-wire part, an outer non-metal rim part, the inner part being seated within a groove upon the inner side of the outer part, and the said two parts being slidably connected, and means for preventing accidental relative sliding movement of said parts.

9. A rim for ophthalmic lenses comprising an inner metal eye-wire part, portions of said eye-wire part being provided with notches therein, an outer non-metallic rim part provided with a groove upon its inner side in which the said metal part is slidably seated, and the said outer part having projections which extend into said notches.

In testimony that I claim the foregoing as my invention I have hereunto signed my name this 20th day of April, A. D., 1920.

EDGAR R. DURGIN.